United States Patent [19]

Itoh et al.

[11] Patent Number: 4,772,644

[45] Date of Patent: Sep. 20, 1988

[54] METHOD FOR RESIN ENCAPSULATION OF A SEMICONDUCTOR DEVICE AND A RESIN COMPOSITION THEREFOR

[75] Inventors: Kunio Itoh; Kiyoshi Yokokawa; Tetuo Yoshida; Kazuo Koya, all of Gunma, Japan

[73] Assignee: Shin-Etsu Chemical Co., Ltd., Tokyo, Japan

[21] Appl. No.: 459,220

[22] Filed: Jan. 19, 1983

[30] Foreign Application Priority Data

Jan. 25, 1982 [JP] Japan .................................. 57-9749

[51] Int. Cl.$^4$ ............................................. C08K 3/36
[52] U.S. Cl. .................................... 523/443; 524/493; 423/337
[58] Field of Search ....................... 523/443; 524/493; 423/337

[56] References Cited

U.S. PATENT DOCUMENTS

| | | | |
|---|---|---|---|
| 4,070,330 | 1/1978 | Rawlings | 524/493 |
| 4,118,595 | 10/1978 | Pfahnl et al. | 524/493 |
| 4,200,445 | 4/1980 | Bihuniak et al. | 523/337 |
| 4,292,268 | 9/1981 | Salensky | 523/443 |
| 4,293,479 | 10/1981 | Hanada et al. | 524/493 |

FOREIGN PATENT DOCUMENTS

| | | | |
|---|---|---|---|
| 55-160043 | 12/1980 | Japan | 524/493 |
| 56-31887 | 7/1981 | Japan | 524/493 |

OTHER PUBLICATIONS

Katz et al.; Handbook of Fillers and Reinforcements for Plastics: Van Nostrand Reinhold Co.; 1978; pp. 137-139.

*Primary Examiner*—Lewis T. Jacobs
*Attorney, Agent, or Firm*—Jules E. Goldberg

[57] ABSTRACT

While high-performance semiconductor devices encapsulated with a resin composition are subject to the problem of wrong operation due to the alpha-particles emitted from the trace amounts of radioactive impurities, e.g. uranium and thorium, contained in the silica filler incorporated in the resin composition, a means for solving this problem is provided by use of a silicon dioxide powder obtained by the pyrolysis of a volatilizable silicon compound free from radioactive impurities in an oxidizing condition and having an average particle diameter in the range from 0.5 to 100 μm in place of the conventional silica fillers.

1 Claim, No Drawings

METHOD FOR RESIN ENCAPSULATION OF A SEMICONDUCTOR DEVICE AND A RESIN COMPOSITION THEREFOR

BACKGROUND OF THE INVENTION

The present invention relates to a method for encapsulating a semiconductor device, such as transistors and LSIs, with a resin composition and a novel resin composition therefor.

As is well known, various kinds of semiconductor devices used in the technology of electronics are packaged with a ceramic material or encapsulated with a resin composition in order to be protected from the adverse influences of environment such as moisture, heat, dusts, stains and the like as well as from mechanical damages. The method of resin encapsulation is preferred to the ceramic packaging owing to the lower costs and higher productivity of the method and various kinds of resin compositions have been proposed for such a purpose.

The resin composition for encapsulation of a semiconductor device is usually composed of a synthetic resin, which may be thermosetting or thermoplastic, and an inorganic filler, i. e. an inorganic finely divided partriculate material, dispersed in the resin as a matrix. The proportion of the inorganic filler to the resin matrix should be as large as possible in order to impart the resin composition with small coefficient of expansion, high thermal conductivity, low moisture permeability and excellent mechanical properties as well as from the standpoint of decreasing the costs of the resin composition.

Various kinds of inorganic fillers are currently used in the encapsulating resin compositions but the most preferred among them are the silica fillers in order to fully obtain the above mentioned advantages by the incorporation of an inorganic filler and most of high-performance encapsulating resin compositions are prepared by loading with a silica filler. Silica fillers may be classified into crystalline-type and amorphous-type ones having their own respective advantages and disadvantages suitable or detrimental for a particular resin composition to be used in the intended application.

Along with the remarkably rapid progress of the electronics trechnology in recent years leading to a more and more delicate performance of electronic instruments with, for example, higher and higher degree of integration in LSIs and VLSIs, there have come to the attention of experts certain undesirable phenomena of wrong operation of the instruments called soft errors, the reason for which cannot be other than the failure in the operation of the semiconductor devices built in the instrument. Extensive investigations for the mechanism of such a drawback have revealed that the failure in the operation of the semiconductor devices is caused by the influence of the alpha-particles emitted from a trace amount of the radioactive elements, e.g. uranium and thorium, contained in the silica material as a filler in the resin composition with which the semiconductor devices are encapsulated. This problem is so serious that, for example, the design of the 64K- to 256K-bit dynamic RAM and the like belonging to the earlier development must be influenced thereby. Accordingly, it has been eagerly desired to develop a method for preventing such an undesirable phenomenon due to the influences of radioactivity.

A method has been proposed for such a purpose in which an undercoating is provided on the surface of the semiconductor device before resin encapsulation with an unfilled resin composition such as polyimide resins, silicone resins and the like in such a thickness as not to permit penetration of the alpha-particles. Such a method is, however, not quite acceptable with unreliableness due to the difficulties in providing the undercoating layer having a uniform thickness and over a definite surface area and due to the troubles sometimes caused by the excessive strain or stress as a result of the difference in the thermal expansion coefficients between the surface of the semiconductor device and the undercoating resin and between the undercoating resin and the encapsulating resin composition thereover. In addition, such a method is necessarily disadvantageous from the standpoints of productivity and costs due to the increase in the number of steps in the process of resin encapsulation by the addition of the troublesome step of undercoating.

The above problem due to the radioactivity of the uranium and thorium in the silica filler has been construed unavoidable in so far as the silica filler is prepared from natural silica sources such as ground quartz since quartz and other silica minerals contain such radioactive impurities more or less.

Accordingly, there has been proposed the use of a man-made silica filler including the so-called fumed silica fillers prepared by the oxidative pyrolysis of a volatilizable silicon compound, e.g. silicon tetrachloride, in an oxyhydrogen flame and the precipitated silica fillers prepared by the neutralization of a hydrated sodium silicate with an acid to precipitate the silica followed by drying. Unfortunately, no promising results have been obtained thus far with such man-made silica fillers. The reasons therefor are presumably that such a silica filler is so finely divided that the particle diameter thereof is around 10 nm or so with a specific surface area of 50 $m^2/g$ or larger to give a limitation to the maximum loading amount of the filler into the resin matrix and that the surface of the filler particles have a large amount of silanolic hydroxy groups bonded thereto resulting in an excessively high consistency of the resin composition filled therewith to cause difficulties in uniformly dispersing the filler into the matrix resin in a sufficiently large amount as desired. In addition, even when the silicon compound as the starting material of the precipitated silica filler such as the sodium silicate can be highly purified to be free from the radioactive impurities, the resultant silica filler is not free from the alkaline impurities originating in the starting sodium silicate so that the resin is subjected to the detrimental effects by the alkaline impurities. Therefore, it is a generally accepted conclusion that the man-made silica fillers are far from suitable as a filler in the resin composition for the encapsulation of semiconductor devices.

Thus, there has been known no satisfactory method for encapsulating a semiconductor device with a resin composition without suffering from the adverse influences of the radioactive impurities in the silica filler incorporated into the encapsulating resin composition for semiconductor devices.

SUMMARY OF THE INVENTION

It is therefore an object of the present invention to provide a novel and improved method for the resin encapsulation of a semiconductor device in which the adverse influences due to the radioactive impurities in the silica filler can be almost completely removed.

Another object of the present invention is to provide a novel and improved resin composition suitable for the encapsulation of a semiconductor device without the adverse effects due to the radioactive impurities contained in the silica filler as a dispersant in a resin matrix.

The method of the present invention for the resin encapsulation of a semiconductor device comprises: pyrolyzing a volatilizable silicon compound substantially free from any radioactive impurities in an oxidizing condition into silicon dioxide in a fused state followed by cooling into a glassy state; preparing a powder of the fused silicon dioxide in a glassy state having an average particle diameter in the range from 0.5 to 100 $\mu$m; blending from 50 to 800 parts by weight of the powder of the fused silicon dioxide with 100 parts by weight of a synthetic resin and dispersing the powder in the synthetic resin as a matrix to give a resin composition; and covering at least part of the surface of a semiconductor device with the resin composition.

Accordingly, the resin composition of the present invention for the encapsulation of a semiconductor device comprises: 100 parts by weight of a synthetic resin and from 50 to 800 parts by weight of a powder of silicon dioxide having an average particle diameter in the range from 0.5 to 100 $\mu$m and dispersed in the synthetic resin, said powder of silicon dioxide having been prepared by pyrolyzing a volatilizable silicon compound substantially free from any radioactive impurities in an oxidizing condition to form a silicon dioxide in a fused state followed by cooling into a glassy state and then imparting the silicon dioxide in the glassy state with an average particle diameter in the range from 0.5 to 100 $\mu$m.

DETAILED DESCRIPTION OF THE PREFERRED EMBODIMENTS

As is mentioned above, the resin composition of the invention or the composition used in the inventive method is essentially composed of two components, i.e. the synthetic resin as the matrix and the specific silicon dioxide powder. The type of the synthetic resin is not particularly limitative and any types of the resins used in the conventional silica filler-impregnated resin compositions for encapsulation of semiconductor devices are suitable including thermosetting resins such as silicone resins, epoxy resins, combinations of epoxy and silicone resins, e.g. a resin blend of both or an epoxymodified silicone resin, and thermoplastic resins such as polyphenylene sulfide resins.

The silicone resins above mentioned are well known in the art of synthetic resins and they are prepared usually by the process in which a mixture composed of one or more of trifunctional organosilane compounds represented by the general formula RSiXhd 3, in which R is a monovalent hydrocarbon group such as methyl, ethyl, phenyl and vinyl groups, a part of the groups denoted by R optionally being silicon-bonded hydrogen atoms, and X is a hydrolyzable atom or group such as a halogen atom and an alkoxy group, and one or more of difunctional organosilane compounds represented by the general formula $R_2SiX_2$, in which R and X each have the same meaning as defined above, is subjected to co-hydrolysis followed by the silanol condensation of the hydrolysis product in the presence of a suitable catalyst. The curing of the silicone resin is effected typically either by the condensation reaction between the residual silanolic hydroxy groups in the resin promoted by a suitable curing catalyst such as a lead compound or by the addition reaction of so-called hydrosilation between silicon-bonded ethylenically unsaturated hydrocarbon groups, e.g. vinyl, and silicon-bonded hydrogen atoms as catalyzed by, for example, a platinum compound when the silicone resin has been prepared from a combination of the silanes as defined above, one having an ethylenically unsaturated hydrocarbon groups and the other a silicon-bonded hydrogen atoms as R. The above-mentioned combination of epoxy and silicone resins is described, for example, in U.S. Pat. No. 3,971,747 and the resin disclosed there is curable with an aluminum catalyst although not limitative thereto.

The epoxy resin is a prepolymer having at least two epoxy groups in a molecule including those synthesized from epichlorohydrin and bisphenol A or a phenolic novolac resin and cyclic epoxy resins as well as those containing halogen atoms, e.g. chlorine and bromine, in the molecule. Curing of these epoxy resins is usually promoted by a curing agent which may be an amine compound such as diaminodiphenylmethane, diaminodiphenylsulfone, 1,3-phenylene diamine and the like, an acid anhydride compound such as phthalic anhydride, pyromellitic anhydride, benzophenone tetracarboxylic acid anhydride and the like or a novolac prepolymer having at least two hydroxy groups in a molecule such as phenol novolac resins, cresol novolac resins and the like. Curing of the epoxy resins can be further accelerated by the addition of a curing accelerator such as imidazol or derivatives thereof, derivatives of tertiary amines and phosphine compounds.

The most preferred as the thermoplastic resin for the matrix of the inventive encapsulating resin composition from the standpoint of obtaining highest heat resistance is a polyhenylene sulfide resin prepared by the reaction of, for example, 1,4-dichlorobenzene and sodium sulfide in N-methylpyrrolidone to form a molecular structure in which the benzene rings are connected together through sulfide linkages. These polyphenylene sulfide resins are excellent in their extremely low permeability of moisture, high resistance against corrosion by chemicals and outstanding flame retardancy in addition to the above mentioned heat resistance as well as in their high dimensional stability so that they are very useful as the matrix resin in the encapsulating resin compositions for semiconductor devices in just a like manner as the above described silicone and epoxy resins.

Meanwhile, apart from the problem of preventing the adverse influences by the alpha particles, the impurity contents in these matrix resins should be reduced as far as possible. Undesirable impurities in this connection include the unreacted monomer or monomers, hydrolyzable halogen atoms and ionic impurities such as sodium and potassium and their contents should preferably be reduced not to exceed certain upper limits depending on the desired performance of the semiconductor device.

In the next place, the second essential component comprised in the inventive encapsulating resin composition is the specific silicon dioxide powder as defined above. Such a silicon dioxide powder is obtained, for example, by the fusion or growth of finely divided silicon dioxide particles formed by the high temperature oxidative pyrolysis of a volatilizable silicon compound. It is essential that the starting volatilizable silicon compound should be substantially free from any radioactive impurities such as uranium and thorium in order that the silicon dioxide powder prepared therefrom is substantially free from the alpha emitters with the total content of uranium and thorium, for example, not exceeding 10 p.p.b. In this regard, it is desirable that the starting volatilizable silicon compound is thoroughly purified by rectifying distillation or other suitable purification methods and checked for the contents of the radioactive impurities before being subjectd to the high temperature oxidative pyrolysis, which may be performed by introducing the vapor or spray of the silicon compound into an oxyhydrogen flame or into a plasma atmosphere of oxygen gas produced by supplying high frequency electric power.

As is understood from the above description, it is of course that the silicon compound should be a gas or a liquid readily volatilizable or atomizable by spraying. In this regard, the silicon compound suitable for the purpose is preferably a silane compound represented by the general formula $R^1_m SiX_{4-m}$, in which $R^1$ is a hydrogen atom or a monovalent hydrocarbon group, X is a halogen atom or an alkoxy group and m is an integer of 0 to 4 inclusive. Examples of such silicon compounds include silane $SiH_4$, silicon tetrachloride $SiCl_4$, trichlorosilanea $HSiCl_3$, methyl trichlorosilane $CH_3SiCl_3$, tetramethoxy silane $Si(OCH_3)_4$, methyl trimethoxy silane $CH_3Si(OCH_3)_3$ and the like.

The oxidative decomposition of the volatilizable silicon compound as exemplified above to form silicon dioxide is performed by blowing the vapor or spray of the silicon compound at a refractory target together with an oxyhydrogen flame or plasma flame to deposit fine particles of silicon dioxide on the surface of the target. The size of the silicon dioxide particles as deposited on the target is so fine that the thus formed silicon dioxide powder is not suitable as such as the filler to be incorporated into the encapsulating resin composition of the invention.

Accordingly, it is essential that the thus formed silicon dioxide is imparted with an appropriate particle size distribution by a suitable means. One of the preferred processes for such a purpose of particle size control is that the fine particles deposited on the refractory target are collected and melted together followed by cooling into a block of silicon dioxide in a glassy state followed by washing with, for example, a dilute hydrofluoric acid, rinsing with water and drying and then by pulverization first by crushing in a jaw crusher or the like machine and then by milling in a ballmill or the like pulverizing machine.

Alternatively, the fine particles of silicon dioxide deposited on the refractory target can be grown in situ when the flame blowing with the vapor or spray of the silicon compound is continued thereon for a desired length of time, optionally, along with a continuous movement of the target to bring the thus grown silicon dioxide particles into a cooling zone where the silicon dioxide particles are collected off the target.

The particle size distribution of the silicon dioxide powder, which is one of the important parameters thereof, should be such that the average particle diameter is in the range from 0.5 to 100 μm since a silicon dioxide powder having an average particle diameter smaller than 0.5 μm is excessively fine and can be uniformly blended with or incorporated into the matrix resin in a desired large amount only with extreme difficulties resulting in a high consistency of the resin composition handled with troubles while, on the other hand, a silicon dioxide powder containing a large amount of particles coarser than 100 μm in diameter causes drawbacks in the subsequent processing of the resin composition such as shaping or encapsulation of a semiconductor device by use of a metal mold because the gate of the metal mold is sometimes blocked by the coarse particles greatly decreasing the productivity.

The encapsulating resin composition for semiconductor devices according to the invention is prepared by uniformly blending the synthetic resin and the silicon dioxide powder by use of a suitable blending machine such as a hot roller mill, kneader, continuous screw-type blender and the like known in the art of resin processing. The amount of the silicon dioxide powder in the resin composition should preferably be as high as possible in order that the resin composition is imparted with lower coefficient of thermal expansion and higher thermal conductivity although the upper limit of the loading amount of the silicon dioxide powder is given by the excessively high consistency and decreased moldability of the resin composition in addition to the decreased mechanical properties of the shaped and cured resin composition when the loading amount of the silicon dioxide powder exceeds 800 parts by weight per 100 parts by weight of the synthetic resin as the matrix. On the other hand, no desired effects can naturally be obtained by the incorporation of the silicon dioxide powder into the resin composition when the loading amount of the silicon dioxide powder is smaller than, for example, 50 parts by weight per 100 parts by weight of the synthetic resin as the matrix. Thus, a preferred formulation of the inventive resin composition is obtained with from 50 to 800 parts by weight of the silicon dioxide powder per 100 parts by weight of the synthetic resin as the matrix.

It is optional in the formulation of the resin composition that the composition is further admixed with various kinds of additives known in the art of synthetic resins including, for example, coloring agents, flame retardants, mold release agents and the like. It is further optional that the inventive resin composition is admixed with conventional inorganic fillers including those produced by the fuming process such as fumed silica filler, fumed alumina filler, fumed titanium dioxide filler and the like. Needless to say, these additional additive agents should be carefully examined to ensure that they are substantially free from any radioactive impurities in order not to reduce the advantages of the present invention.

The above described resin composition of the invention for the encapsulation of semiconduotor devices can be used in just the same manner as in the conventional resin compositions of similar types. It is convenient that the resin composition is first pelletized or granulated and the encapsulation of a semiconductor device is performed with such pellets or granules by a conventional technique of injection molding, compression molding, transfer molding or the like method.

In the following, examples are given to illustrate the present invention in further detail. In the examples, "parts" always refers to "parts by weight".

EXAMPLE 1

A silicon dioxide powder was prepared in the following manner. Thus, oxygen gas carrying the vapor of silicon tetrachloride coming out of a bath of purified liquid silicon tetrachloride, into which the oxygen gas was continuously introduced to bubble therein, was blown at a quartz-made target together with an oxyhydrogen flame through a burner nozzle and the fine particles of silicon dioxide formed by the pyrolysis and deposited on the target were collected and melted together into a block of silicon dioxide in a glassy state.

This block of silicon dioxide was, after washing with a 5% hydrofluoric acid, rinsing with deionized water and drying, crushed in a jaw crusher and then subjected to milling for 20 hours in a ballmill. Coarse particles were removed from the thus pulverized silicon dioxide powder by passing through a screen of 100 mesh opening by the Tyler standard so that the silicon dioxide powder had an average particle diameter of about 8 μm. Assay of this silicon dioxide powder for the radioactivity indicated substantial absence of any radioactive impurities or, in particular, alpha emitters such as uranium and thorium in the powder.

Three resin compositions I, II, III and IV for encapsulation of a semiconductor device were prepared each in the following manner. The compositions I to III were for the invention and the composition IV was for comparative purpose.

Resin composition I: an epoxy resin composition composed of 100 parts of a cresol novolac epoxy resin (ECN 1273, a product by Ciba Geigy Co.), 50 parts of a phenol novolac resin (TV-2093, a product by Dai-Nippon Ink Chem. Co.) and 1 part of 2-phenyl imidazol as a curing accelerator was admixed with 300 parts of the above obtained silicon dioxide powder, 1 part of a mold release agent (OP Wax, a produot by Hoechst Co.), 2 of carbon black and 1 part of 3-glycidyloxypropyl trimethoxy silane (KBM 403, a product by Shin-Etsu Chem. Co.) and the mixture was uniformly kneaded for 5 minutes in a 8-inch roller mill heated at 80° C. followed by shaping into a sheet out of the roller mill. This sheet of the resin composition was crushed after cooling into granules.

Resin composition II: the procedure for the preparation of granules of the resin composition was substantially the same as in the preparation of the resin composition I above excepting that the formulation of the resin composition was composed of 100 parts of a methyl phenyl organopolysiloxane in which the molar ratio of the organic groups to the silicon atoms was 1.05 with the methyl/phenyl molar ratio of 1.2 and the content of the silanolic hydroxy groups was 4.5% by weight, 200 parts of the above obtained silicon dioxide powder, 0.5 part of calcium stearate as a mold release agent, 0.8 part of lead carbonate as a curing catalyst and 1.5 parts of benzoic acid.

Resin composition III: 100 parts of a polyphenylene sulfide resin (Ryton V-1, a product by Philips Petroleum Co.) were admixed with 200 parts of the above obtained silicon dioxide powder and 5 parts of 3-glycidyloxypropyl trimethoxy silane (KBM 403, supra) and the mixture was blended in a Henschel mixe followed by pelletizing into pellets by extruding out of an extruder machine.

Resin composition IV: the formulation and the procedure for the preparation of the resin composition were substantially the same as in the preparation of the above described resin composition I except that the silicon dioxide powder prepared from silicon tetrachloride was replaced with the same amount of a commercially available silica powder (RD-8, a product by Tatsumori Co.), which was, according to the manufacturer, made by fusing and pulverizing natural silica stone and said to be suitable as a filler in a resin composition for resin encapsulation of semiconductor devices.

The radioactivity and performance as an encapsulating resin composition were evaluated for each of the above prepared resin compositions I to IV. Thus, the resin composition was shaped by transfer molding at 160° C. for 3 minutes under a pressure of 170 kg/cm$^2$ followed by post-curing at 180° C. for 4 hours and the thus shaped test pieces were subjected to the measurements of flexural strength and volume resistivity according to the procedures specified in JIS K6911 as well as the analysis of the contents of uranium and thorium and the measurement of the intensity of alpha-particles. Spiral flow test was also undertaken for the thermosetting resin compositions as a measure of the moldability in accordance with the procedure specified in EMHI-I-69. The results are shown in Table 1 below.

TABLE 1

| Resin composition | I | II | III | IV |
|---|---|---|---|---|
| Content of uranium and thorium, p.p.b. | not detectable | not detectable | not detectable | 60 |
| Intensity of alpha particles, α/cm$^2$ · hour | not detectable | not detectable | not detectable | 0.07 |
| spiral flow, inches | 30 | 40 | — | 30 |
| Flexural strength, kg/cm$^2$ | 14.0 | 6.2 | 8.0 | 14.3 |
| Volume resistivity at 150° C., ohm-cm | $1.2 \times 10^{13}$ | $1.3 \times 10^{14}$ | $0.1 \times 10^{12}$ | $0.6 \times 10^{13}$ |

EXAMPLE 2

Vapor of purified silicon tetrachloride was continuously blown together with an oxyhydrogen flame at a quartz plate placed 60 cm apart from the burner nozzle to deposit silicon dioxide powder thereon. The quartz plate target was slowly moved downwardly at such a velocity that the particles of silicon dioxide deposited on the target stayed for about 1 minute within the hot zone on the target at which the oxyhydrogen flame was blown in order to effect growth of the particles. When the silicon dioxide particles thus grown had been sufficienly cooled off the hot zone, the particles were scraped off the quartz plate target by us of a quartz rod and collected. The thus obtained silicon dioxide powder had an average particle diameter of about 50 μm.

Assay of the radioactivity for the above prepared silicon dioxide powder indicated substantial absence of any radioactive impurities such as uranium and thorium. A resin composition was prepared with this silicon dioxide powder in the same formulation as in the resin composition II in Example 1 above and found quite satisfactory for the purpose of resin encapsulation of semiconductor devices with almost undetectable intensity of alpha-particles.

What is claimed is:

1. A resin composition for resin encapsulation of a semiconductor device which comprises: 100 parts by weight of a synthetic resin and from 50 to 800 parts by weight of a powder of silicon dioxide having an average particle diameter in the range from 0.5 to 100 μm and dispersed in the synthetic resin, said powder of silicon dioxide having been prepared by pyrolyzing a volatilizable silicon compound having a radioactive impurity content not exceeding 10 p.p.b. in an oxidizing condition to form a silicon dioxide in a fused state followed by cooling into a glasssy state and then imparting the silicon dioxide in the glassy state with an average particle diameter in the range from 0.5 to 100 μm.

* * * * *